United States Patent
Bagherbeik et al.

(10) Patent No.: US 11,562,211 B2
(45) Date of Patent: Jan. 24, 2023

(54) SYSTEM LOCAL FIELD MATRIX UPDATES

(71) Applicant: FUJITSU LIMITED, Kawasaki (JP)

(72) Inventors: Mohammad Bagherbeik, Toronto (CA); Ali Sheikholeslami, Toronto (CA); Hirotaka Tamura, Kawasaki (JP); Kouichi Kanda, Kawasaki (JP)

(73) Assignees: FUJITSU LIMITED, Kawasaki (JP); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 336 days.

(21) Appl. No.: 16/849,887

(22) Filed: Apr. 15, 2020

(65) Prior Publication Data

US 2021/0326679 A1 Oct. 21, 2021

(51) Int. Cl.
*G06N 3/00* (2006.01)
*G06N 3/04* (2006.01)
(Continued)

(52) U.S. Cl.
CPC ........... *G06N 3/0472* (2013.01); *G06F 17/16* (2013.01); *G06N 3/08* (2013.01)

(58) Field of Classification Search
CPC ........ G06N 3/0472; G06N 3/08; G06N 7/005; G06N 5/003; G06K 9/6218; G06F 17/11; G06F 17/16
See application file for complete search history.

(56) References Cited

U.S. PATENT DOCUMENTS 9,501,747 B2 * 11/2016 Roy .................. G06N 10/00
2018/0075342 A1 3/2018 Tamura et al.
(Continued)

FOREIGN PATENT DOCUMENTS

EP 2224256 A1 * 9/2010 ......... G06F 17/5009
EP 3896585 A1 * 10/2021 .............. G06F 17/11
(Continued)

OTHER PUBLICATIONS

Kanazawa, K., "Acceleration of Solving Quadratic Assignment Problems on Programmable SoC using High Level Synthesis" Fourth International Workshop on FPGAs for Software Programmers (FSP 2017), Feb. 17, 2017.
(Continued)

*Primary Examiner* — Naum Levin
(74) *Attorney, Agent, or Firm* — Maschoff Brennan

(57) ABSTRACT

According to an aspect of an embodiment, operations may include obtaining a first matrix associated with an optimization problem associated with a system and obtaining a second matrix associated with the optimization problem. The operations may include obtaining a local field matrix that indicates interactions between the variables of the system as influenced by their respective weights. The operations may include updating the local field matrix. Updating the local field matrix may include performing arithmetic operations with respect to a first portion of the first matrix and a second portion of the second matrix that correspond to a third portion of the local field matrix that corresponds to the one or more variables. The operations may include updating an energy value of the system based on the updated local field matrix and determining a solution to the optimization problem based on the energy value.

20 Claims, 8 Drawing Sheets

(51) Int. Cl.
*G06F 17/16* (2006.01)
*G06N 3/08* (2006.01)

(56) References Cited

U.S. PATENT DOCUMENTS

| | | | | |
|---|---|---|---|---|
| 2018/0308007 | A1* | 10/2018 | Amin | G06N 3/0472 |
| 2019/0205730 | A1* | 7/2019 | Sumbul | G06N 3/088 |
| 2019/0391807 | A1 | 12/2019 | Inagaki et al. | |
| 2020/0042570 | A1* | 2/2020 | Tamura | G06N 3/08 |
| 2020/0278385 | A1* | 9/2020 | Matsubara | G06N 7/005 |
| 2020/0327393 | A1* | 10/2020 | Yoneoka | C21D 1/00 |

FOREIGN PATENT DOCUMENTS

| | | | | |
|---|---|---|---|---|
| JP | | 2020038435 A | * 3/2020 | |
| JP | | 6773970 B2 | * 10/2020 | G06N 3/0445 |

OTHER PUBLICATIONS

Sunuc et al., "A cooperative GPU-based Parallel Multistart Simulated Annealing algorithm for Quadratic Assignment Problem" Engineering Science and Technology, an International Journal 21 (2018) 843-849.
De Gloria, Alessandro, Paolo Faraboschi, and Sandro Ridella. "A dedicated massively parallel architecture for the Boltzman machine" Parallel Computing 18.1 (1992): 57-73.
DeGloria, Alessandro, Paolo Faraboschi, and Mauro Olivieri. "Efficient implementation of the Boltzmann machine algorithm." IEEE transactions on neural networks 4.1 (1993): 159-163.
De Gloria, Alessandro, Paolo Faraboschi, and Mauro Olivieri. "Clustered Boltzmann Machines: Massively parallel architectures for constrained optimization problems." Parallel Computing 19.2 (1993): 163-175.
Extended European Search Report dated Jul. 14, 2021 as received in application No. 21156231.9.
S. V. Isakov et al.: "Optimised simulated annealing for Ising spin glasses" Jun. 17, 2014.

* cited by examiner

| Algorithm |
|---|
| Turning bits $x_{k,l}$ and $x_{k',l'}$ OFF |
| Turning bits $x_{k',l}$ and $x_{k,l'}$ ON |
| 1: for i in DIM do |
| 2:     $h[i,:] \mathrel{+}= F[k',i]*D[l,:] + F[k,i]*D[l',:]$ |
| 3: for i in DIM do |
| 4:     $h[i,:] \mathrel{-}= F[k',i]*D[l',:] + F[k,i]*D[l,:]$ |

160

H

164

162

D

164

F

164

Dim-To-1 Mux

166

165

168a

168b

| Algorithm |
| --- |
| Turning bits $x_{k,l}$ and $x_{k',l'}$ OFF |
| Turning bits $x_{k',l}$ and $x_{k,l'}$ ON |
| 1: for i in DIM do |
| 2: $\quad h[i,:] \mathrel{+}= F[k',i]*D[l,:] + F[k,i]*D[l',:]$ |
| 3: $\quad h[i,:] \mathrel{-}= F[k',i]*D[l',:] + F[k,i]*D[l,:]$ |

SYSTEM LOCAL FIELD MATRIX UPDATES

FIELD

The embodiments discussed herein are related to updating local field matrices of systems.

BACKGROUND

Combinatorial optimization problems are often categorized as NP-Problems (Nondeterministic Polynomial time Problems) such as NP-hard or NP-complete problems, in which there often are no known algorithms to solve such problems in polynomial time. Such combinatorial optimization problems may appear in numerous applications such as minimization of the number of vias in layout design, maximization of the return from a stock portfolio, airline routing and scheduling, and wireless sensor networks.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may include obtaining a first matrix associated with an optimization problem associated with a system and obtaining a second matrix associated with the optimization problem. The first matrix and the second matrix may relate to corresponding weights given to respective variables of the system in which the corresponding weights relate to relationships between the respective variables and one or more other variables. The operations may include obtaining a local field matrix that indicates interactions between the variables of the system as influenced by their respective weights. The interactions may relate to changing of states of the variables during solving of the optimization problem. In response to a state change of one or more variables of the system during solving of the optimization problem, the operations may include updating the local field matrix. Updating the local field matrix may include performing one or more arithmetic operations with respect to a first portion of the first matrix and a second portion of the second matrix that correspond to a third portion of the local field matrix that corresponds to the one or more variables. The operations may include updating an energy value of the system based on the updated local field matrix and determining a solution to the optimization problem based on the energy value.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
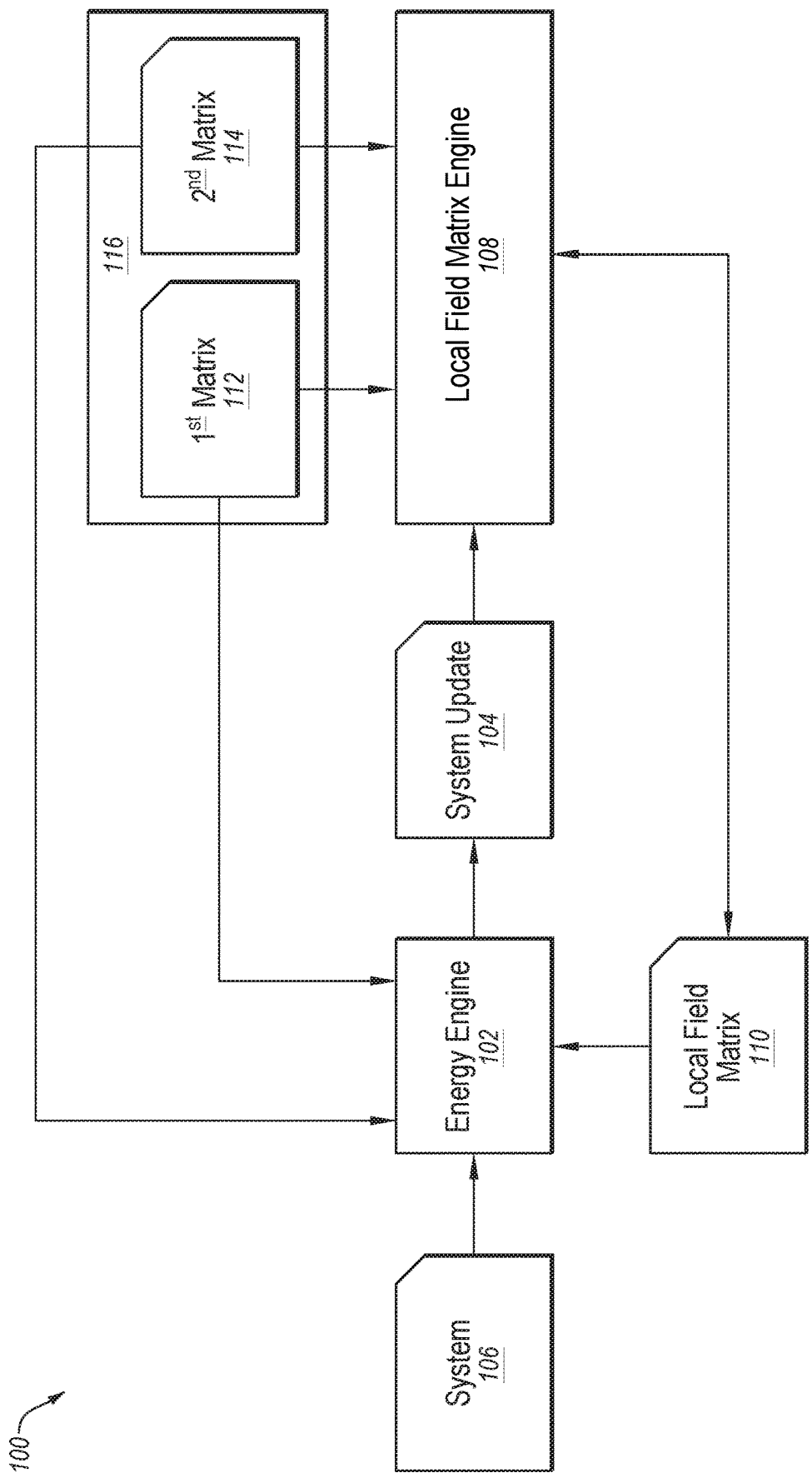
FIG. 1A is a diagram representing an example environment configured to solve an optimization problem.

Combinatorial optimization problems may include a class of optimization problems that may be used to determine a maximum or a minimum value of an energy or cost function of a system. For example, combinatorial optimization may be used to minimize a number of vias of a circuit layout design, maximize stock returns, improve airline routing and scheduling, configure of wireless sensor networks, among other applications.

In some instances, an Ising Model may be used to solve optimization problems. In particular, an Ising energy ("energy") of the Ising Model may be a representation of an overall state space of a particular system that corresponds to a particular optimization problem. A minimization technique that determines a minimum of the energy or a maximization technique that determines a maximum of the energy may be used to solve the optimization problem. For example, a state of the particular system that corresponds to the determined minimum or maximum energy may be used a solution to the particular optimization problem. Reference to determining a minimum energy or maximum energy is not limited to determining the absolute minimum energy or the absolute maximum energy of a system. Instead, reference to determining a minimum energy or a maximum energy may include performing minimization or maximization operations with respect to energy of a system in which an output from such operations is used as a solution to the corresponding optimization problem.

As detailed below, a local field matrix may be used to indicate an amount of change in the energy of the particular system when the state of a variable of the particular system is changed. The local field matrix includes values that are based on interactions between the variables of the particular system as influenced by their respective weights with respect to the changing of the states of one or more of the variables. As discussed in detail below, according to one or more embodiments of the present disclosure, a particular technique may be used to determine and update the local field matrix and/or the energy of a system during the solving of a corresponding optimization problem in a manner that reduces memory requirements and/or processing requirements. For example, as indicated above, the local field matrix may be based on weights that correspond to the variables of the particular system. Further, the energy may be based on the weights. As described in detail below, the local field matrix and/or energy may be updated during the solving of the optimization problem by determining the values of related weights during the solving of the optimization problem. The determination of the weighs may accordingly be done in substantially real time instead of by saving a weight matrix that includes the values for the weights and then accessing the weights for the updating of the local field matrix and/or the energy.

The ability to avoid storage of the weight matrix may provide significant memory savings because the weight matrix may be an extremely large matrix. Instead, as detailed below, matrices that are much smaller may be stored and their corresponding values may be used to determine the weight values. As such, the amount of memory used in the solving of optimization problems may be reduced. Additionally or alternatively, in some embodiments, the reduced storage requirements may enable all of the storage to be performed on a single processing chip (e.g., via a cache of the chip), which may improve the processing speed of solving optimization problems by reducing or avoiding calls to memory that may be stored off chip. Therefore, the computing systems used in the solving of optimization problems may be improved by reducing memory requirements of those systems with respect to solving the optimization problems.

Embodiments of the present disclosure are explained with reference to the accompanying drawings.

FIG. 1A is a diagram representing an example environment 100 configured to solve optimization problems, arranged in accordance with at least one embodiment described in the present disclosure. The environment 100 may include an energy determination engine 102 ("energy engine 102") configured to update and output a system update 104 of a system 106. In these or other embodiments, the environment 100 may include a local field matrix engine 108 ("LFM engine 104") configured to update a local field matrix 110 ("LFM 110") based on the system update 104.

The system 106 may include any suitable representation of an optimization problem that may be solved. For example, in some embodiments the system 106 may include a state vector X that may include a set of variables that may each represent a characteristic related to the optimization problem. The state vector X may accordingly represent different states of the system 106. For example, a first state vector X1 with variables each having first values may represent a first state of the system 106 and a second state vector X2 with the variables having second values may represent a second state of the system 106. In these or other embodiments, the difference between the state vectors X1 and X2 may be anywhere from only one corresponding variable in both X1 and X2 having a different value to every variable in X1 and X2 having different values.

By way of example, the system 106 may be a neural network that may include any suitable number of nodes (also referred to as "neurons"). In these or other embodiments, the state vector X of the system 106 may represent the states of each of the neurons of the neural network. For example, each neuron may be a bit that may have a value of "0" or "1" and the state vector X may include a "1" value or a "0" value for each neuron of the neural network. In these or other embodiments, the neural network may be configured to solve one or more different types of optimization problems in any suitable manner.

In some embodiments, the neural network of the system 106 may be configured as a Boltzmann machine. In these or other embodiments, the Boltzmann machine may be configured as a clustered Boltzmann machine (CBM) in which the neurons of the Boltzmann machine may be grouped into clusters. The clusters may be formed such that there may be no connections between neurons within the same cluster (e.g., the weights between neurons of a cluster may be "0"). In these or other embodiments, the CBM may be configured to have an at-most-n constraint in which only "n" number of neurons in any given cluster may be active (e.g., have a bit value of "1"). For example, the CBM may have an exactly-1 (also referred to as "1-hot encoding") constraint such that at all times, exactly one of the neurons in a cluster is active (e.g. have a bit value of "1") and the rest of the neurons in the cluster must be inactive (e.g. have a bit value of "0"). Example clustering that may be used is row clustering and/or column clustering with respect to the rows and columns of the state matrix X. In these or other embodiments, clusters may be combined to form a cross cluster. For example, a row cluster may be combined with a column cluster to form a cross cluster. Such a cross cluster configuration with an exactly-1 constraint may constrain the state matrix X such that only one neuron may be active in each row and each column of the state matrix X.

In some embodiments, the state matrix X may be reduced in size using clustering. For example, for a given cluster (e.g., a specific row) with an exactly-1 constraint, only one neuron may be active, as such rather than storing values indicating the state of every neuron of the cluster, a single index value that indicates which neuron in the cluster is active may be stored instead. In such instances the state matrix X may be represented by a state vector X.

Additionally or alternatively, the system 106 may include an Ising Model that is mapped to the optimization problem to represent an Ising energy of the optimization problem that corresponds to the system 106. For example, the Ising energy of a system with variables having binary states may be represented by the following expression (1):

$$E(x) = -\sum_{i=1}^{N} \sum_{j=i+1}^{N} w_{i,j} x_i x_j - \sum_{i=1}^{N} b_i x_i \quad (1)$$

In the above expression (1), $x_i$ is the $i_{th}$ variable of the state vector X that represents a corresponding state matrix X and can be either 0 or 1; $x_j$ is the $j_{th}$ variable of the state vector X and can be either 0 or 1; $w_{ij}$ is a connection weight between the $i_{th}$ and $j_{th}$ variables of X; and $b_1$ is a bias associated with the $i_{th}$ element.

The energy engine 102 may include code and routines configured to enable a computing system to perform one or more of the operations described therewith. Additionally or alternatively, the energy engine 102 may be implemented using hardware including any number of processors, microprocessors (e.g., to perform or control performance of one or more operations), field-programmable gate arrays (FPGAs), application-specific integrated circuits (ASICs) or any suitable combination of two or more thereof.

Alternatively or additionally, the energy engine 102 may be implemented using a combination of hardware and software. In the present disclosure, operations described as being performed by the energy engine 102 may include operations that the energy engine 102 may direct a corresponding system to perform.

In some embodiments, the energy engine 102 may be configured to randomly generate (e.g., via a stochastic process) a proposed change to one or more variables of the state vector X. For example, in some embodiments, in a CBM with an exactly-1 constraint, a proposed change may include changing an inactive neuron to being active and consequently changing the active neuron to being inactive. Therefore, two changes (e.g., bit flips) may occur with respect to any given cluster. Additionally or alternatively, in a cross-cluster configuration of with an exactly-1 constraint, such as a combined row cluster and combined column cluster configuration, a proposed change may include a four bit flips because changing the states of neurons in a particular row also affects the columns to which the changed neurons belong.

In some embodiments, the determination as to whether to accept a particular change for a particular cluster may be based on any suitable probability function. In these or other embodiments, the probability function may be based on a change in the system energy that may be caused by the particular change. In some embodiments, the change in the system energy may be determined using the LFM 110.

The LFM 110 may indicate interactions between the variables of the system 106 as influenced by their respective weights with respect to changing of states of the variables. For example, the values for the variables of the system 106 of the LFM 110 may be expressed as follows in expression (2):

$$h_i(x) = -\Sigma_{\forall j, j \neq i} w_{i,j} x_j - b_i \quad (2)$$

In expression (2) $h_i(x)$ is the local field value of the $i_{th}$ variable of a local field matrix H, in which the $i_{th}$ variable of the local field matrix H corresponds to the $i_{th}$ variable of a corresponding state matrix X; $x_j$ is the $j_{th}$ variable of the state vector X and can be either 0 or 1; $w_{ij}$ is the connection weight between the $i_{th}$ and $j_{th}$ variables of X; and $b_i$ is the bias associated with the $i_{th}$.

As indicated above, in some embodiments, the change in the system energy with respect to a proposed change may be based on the LFM 110. For example, a change in the system energy for a non-cross clustered CBM (e.g., for a row cluster of a CBM) may be determined as follows in expression (3):

$$\Delta E_{RC}(X_{RC}, k) = h_{k,j} - h_{k,i} \quad (3)$$

In expression (3), k represents a given row of the state matrix X as indexed by a corresponding state vector $X_{RC}$ and $h_{k,j}$ and $h_{k,i}$ correspond to the neurons involved in the proposed change. In expression (3) $h_{k,j}$ is the local field matrix value that corresponds to the neuron $x_{k,j}$ that is inactive and $h_{k,i}$ is the local field matrix value that corresponds to the neuron $x_{k,i}$ that is active prior to the proposed swap that would activate $x_{k,j}$ and deactivate $x_{k,i}$.

As another example, a change in the system energy for a cross clustered CBM (e.g., for a row/column cross-clustered CBM) may be determined as follows in expression (4):

$$\Delta E_{XC}(X_{XC}, k, k') = -(h_{k,l} + h_{k',l'}) + (h_{k,l'}, h_{k',l}) - (w_{k,l:k',l'} + w_{k,l':k',l}) \quad (4)$$

In expression (4), k and k' represents rows of the state matrix X as indexed by a corresponding state vector $X_{XC}$; l and l' represent the indices of the active neurons in rows k and k', respectively, in the state vector $X_{XC}$; $h_{k,l}$, $h_{k',l'}$, $h_{k,l'}$ and $h_{k',l}$ correspond to the neurons involved in the proposed change similar to described above; and $w_{k,l:k',l'}$ and $w_{k,l':k',l}$ correspond to the weights that may correspond to the neurons at issue with respect to the proposed change. As described in further detail below, in some embodiments, the energy engine 102 may be configured to determine the values of $w_{k,l:k',l'}$ and $w_{k,l':k',l}$ in expression (4) based on a first matrix 112 and a second matrix 114, such as by using one or more of expressions (13) and (14) detailed below.

As indicated above, the probability as to whether to accept a proposed change for one or more variables may be accepted may be based on the change in the system energy that may occur in response to the proposed change. For example, the acceptance probability for a proposed change in the system for a non-cross clustered CBM (e.g., for a row cluster of a CBM) in which the change in energy is determined based on expression (3) above may be determined as follows in expression (5):

$$P(X_{RC}, k) = e^{\frac{-\Delta E_{RC}(X_{RC}, k)}{t}} \quad (5)$$

In expression (5), $\Delta E_{RC}(X_{RC}, k)$ may be the energy change determined from expression (3) and t may be a scaling factor that may be used to influence whether or not to make a change. For example, t may be the "temperature" that is used as a scaling factor when performing a simulated or digital annealing process such as replica exchange (also referred to as "parallel tempering").

As another example, the acceptance probability for a proposed change in the system for a cross clustered CBM (e.g., for a row/column cross cluster of a CBM) in which the change in energy is determined based on expression (4) above may be determined as follows in expression (6):

$$P(X_{XC}, k, k') = e^{\frac{-\Delta E_{RC}(X_{XC}, k, k')}{t}} \quad (6)$$

In expression (6), $\Delta E_{RC}(X_{XC}, k, k')$ may be the energy change determined from expression (4) and t may be the scaling factor such as that described above with respect to expression (5).

The energy engine 102 may output a system update 104. The system update 104 may include the updates to the system 106 that may occur in response to accepting one or more proposed changes.

In some embodiments, the energy engine 102 may be included in or part of an annealing system (e.g., a digital annealing system or a quantum annealing system). In these or other embodiments, the energy engine 102 may be configured to perform a replica exchange Markov Chain Monte Carlo (MCMC) process with respect to the system 106. For example, the energy engine 102 may be configured to perform replica exchange to find a state vector Xmin that may minimize the energy of the system 106. As another example, the energy engine 102 may be configured to perform replica exchange to find a state vector Xanax that may maximize the energy of the system 106. Replica exchange may include running M copies of the system 106 simultaneously but with different scaling factors that influence whether a change to the system occurs during the running of the copies of the system 106. Therefore, in some embodiments, the energy engine 102 may perform the update operations described above with respect to multiple replicas of the system 106 at different temperature levels.

The LFM engine 108 may be configured to update the LFM 110 based on the updates of the system 106 that may be reflected in the system update 104. Additionally or alternatively, the LFM engine 108 may be configured to initially generate the LFM 110 based on the system 106 upon initialization of solving of the corresponding optimization problem.

As indicated by expression (2) above, the values of the LFM 110 may be based on the values of the state matrix X and the connection weights between the variables of the system 106. The connection weights of the system 106 may correspond to a first matrix 112 and a second matrix 114.

The first matrix 112 and the second matrix 114 may each be a matrix that may represent aspects of the corresponding optimization problem that may create the weights between variables of the system 106. For example, for a Quadratic Assignment Problem (QAP), the first matrix 112 may be a corresponding flow matrix and the second matrix may be a corresponding distance matrix. The first matrix 112 and the second matrix 114 may correspond to any other suitable matrices of any other applicable problem that may be used in an analogous manner as the flow and distance matrices of a QAP.

The LFM engine 108 may be configured to use the first matrix 112 and the second matrix 114 to determine the values of the weights that may be used to update the LFM 110. In some embodiments, the LFM engine 108 may make this determination on an ongoing and dynamic basis each time a new system update 104 occurs. The LFM engine 108 may be configured to use the first matrix 112 and the second matrix 114 to obtain the weights in this dynamic manner on the ongoing basis instead of accessing a stored weight matrix that includes all of the weights already stored therein.

In some embodiments, transposes of the first matrix 112 and the second matrix 114 may be used to obtain the weights. For example, in instances in which the first matrix 112 and/or the second matrix 114 are asymmetric, the transposes of the first matrix 112 and the second matrix 114 may be used to determine the weights, as detailed further below. In these or other embodiments, in instances in which the first matrix 112 and the second matrix 114 are symmetric, the transposes of such matrices may not be used or needed.

The use of the first matrix 112 and the second matrix 114 instead of the weight matrix may improve the storage and/or performance characteristics of the environment 100. For example, the number of elements of the weight matrix is generally orders of magnitude larger than the number of elements of the first matrix 112 and the second matrix 114. For instance, the weight matrix may have $n^4$ number of elements and the first matrix 112 and the second matrix 114 may each have $n^2$ number of elements such that combined they may have $2n^2$ number of elements. As such, using the first matrix 112 and the second matrix 114 to determine the weights rather than storing the weight matrix may result in significant memory savings. For instance, the first matrix 112 and the second matrix 114 may be stored on a computer-readable storage media 116 ("CRM 116") and may occupy much less storage space (e.g., 99% less) than a weight matrix that may be used to keep track of the weight values.

Even in instances in which transposes of the first matrix 112 and the second matrix 114 may be used and stored, the memory savings may still be substantially significant. For example, the total number of elements stored in such a scenario may be $4n^2$, which still may be significantly smaller than $n^4$ depending on the size of n.

In some embodiments, the storage savings may be such that the LFM engine 108, and the CRM 116 may be able to be on the same chip, which may improve processing speeds by reducing the fetch times of the data stored on the CRM 116 with respect to the first matrix 112 and the second matrix 114. Therefore, in some embodiments, the LFM engine 108 and the CRM 116 having the first matrix 112 and the second matrix 114 stored thereon may be on the same chip. Additionally or alternatively, the LFM engine 108 and the CRM 116 having the first matrix 112 and the second matrix 114 stored thereon may be on different chips.

Further, in instances in which the LFM engine 108 is implemented as software instructions, the LFM engine 108 may also be stored on the same CRM 116 as the first matrix 112 and the second matrix 114. Additionally or alternatively, in instances in which the LFM engine 108 is implemented as software instructions, the LFM engine 108 may be stored on a different CRM 116 as the first matrix 112 and the second matrix 114.

In some embodiments, the LFM 110 may also be stored on the same CRM 116 as the first matrix 112 and the second matrix 114. In these or other embodiments, the LFM 110, the first matrix 112, and the second matrix 114 combined may still occupy a much smaller amount of storage space than the weight matrix.

Additionally or alternatively, the LFM 110 may be stored on a different CRM 116 as the first matrix 112 and the second matrix 114. In these or other embodiments, the LFM 110, the first matrix 112, the second matrix 114, the LFM engine 108, and the energy engine 102 may be stored together or alone with respect any suitable configuration of one or more CRM's.

As indicated above, the LFM engine 108 may be configured to update the LFM 110 using the first matrix 112 and the second matrix 114 to determine the weights that correspond to the variables that are updated in the system update 104. In these or other embodiments, the determined weights may be used to update the LFM 110.

For example, the first matrix 112 and the second matrix 114 may be symmetric flow and distance matrices "F" and "D", respectively. Further, the system 106 may include a row/column cross-clustered Boltzmann Machine and the system update 104 may include a change to a particular row "r" and a particular column "c" of the system 106. In such instances, a sub-weight matrix "$w_{r,c}$" may be determined by determining a tensor product of rows "$F_{r,*}$" and "$D_{c,*}$" of the matrices "F" and "D", respectively that correspond to the particular row "r" and the particular column "c" of the system 106 as follows according to expression (7):

$$w_{r,c} = -(F_{r,*})^T \otimes (D_{c,*})^T = \begin{bmatrix} -f_{r,1}D_{c,*} \\ -f_{r,2}D_{c,*} \\ -f_{r,3}D_{c,*} \\ \vdots \\ -f_{r,n}D_{c,*} \end{bmatrix} \quad (7)$$

Based on expressions (2) and (7), the LFM engine 108 may change the portion of the LFM 110 that corresponds to the system update 104 ("$h_{i,*}$") according to the following expression (8):

$$h[i,:] += -F[k',i]*D[l,:]+F[k,i]*D[l',:]-F[k,i]*D[l,:]-F[k',i]*D[l',:]  \quad (8)$$

In expression (8), the values determined from "F[k',i]*D[l,:]+F[k,i]*D[l',:]-F[k,i]*D[l,:]-F[k',i]*D[l',:]" may be added to the values of $h_{i,*}$ to update the LFM 110. Further, k and k' represent rows of the state matrix X that correspond to the state change and l and l' represent the indices of the changed variables within rows k and k' respectively.

Figure 1B:
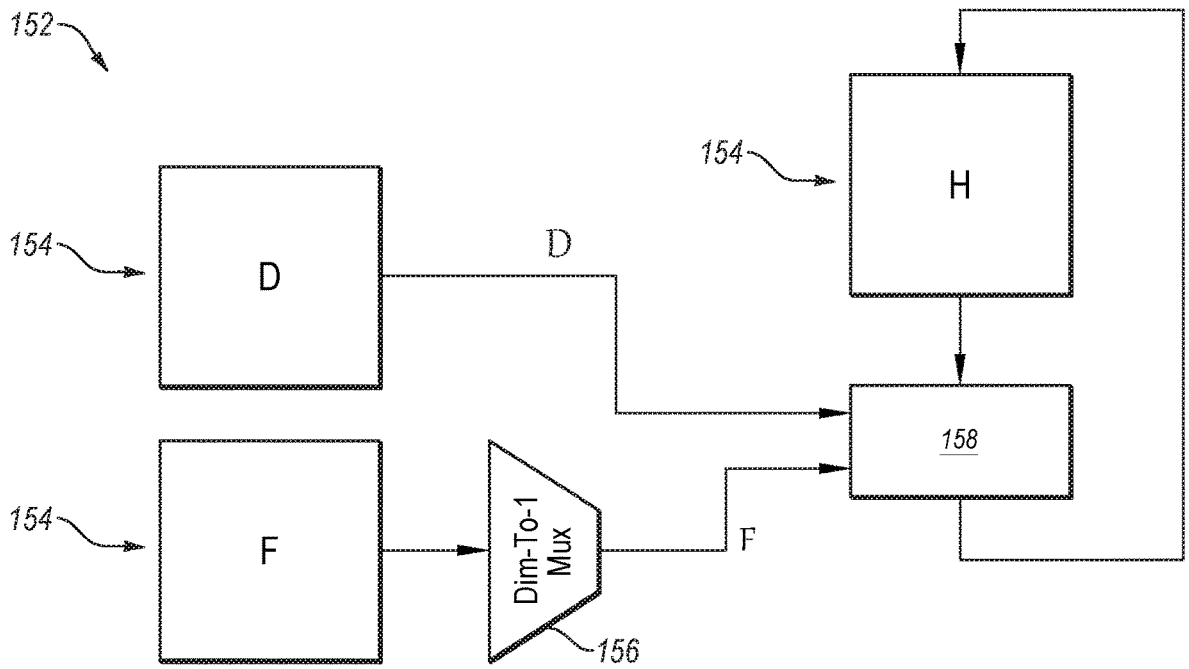
FIG. 1B illustrates example techniques related to updating a local field matrix.

In some embodiments, the LFM engine 108 may be configured to perform the individual product operations and updates of the corresponding four variables at issue of the LFM 110 in sequence. For example, FIG. 1B illustrates an example algorithm 150 that may be used to sequentially update the LFM 110 in an instance in which neurons (referred to in the algorithm 150 as "bits") $x_{k,l}$ and $x_{k',l'}$ have been deactivated and neurons $x_{k',l}$ and $x_{k,l'}$ have been activated as part of the system update 104 of a row/column cross-clustered Boltzmann Machine. The algorithm 150 is configured to update the elements of the LFM 110 that correspond to $x_{k,l}$ and $x_{k',l}$ and $x_{k',l'}$ and $x_{k,l'}$ in a sequential manner. The algorithm 150 may be implemented using any suitable implementation of software and/or hardware.

For example, FIG. 1B also illustrates an example hardware implementation 152 of the LFM engine 108 configured to implement the algorithm 150. In the implementation 152, all of the elements may be stored on the same chip. The implementation 152 may be an example implementation of or may include one or more elements of the computing system 202 of FIG. 2 in some embodiments. Additionally or alternatively, the implementation 152 may use a graphics processing unit (GPU) and/or a field programmable gate array (FPGA) to perform one or more of processing functions in some embodiments.

Further, the LFM 110 may be represented by "H" and the first matrix 112 and the second matrix 114 may be represented by "F" and "D", respectively. Additionally, in the illustrated example, "H", "F", and "D" may be stored on on-chip memory 154 of the implementation 152. The "F" matrix may be a "DIM×DIM" matrix, and a Dim-to-1 mux 156 of the implementation 152 may be configured to select the pertinent portions of "F" in performing the operations of the algorithm 150. Further, the implementation 152 may include an arithmetic element 158 configured to perform the pertinent multiply and add operations of the algorithm 150 with respect to each of the individual elements of "F" and "D" that are associated with the currently performed operation of the algorithm 150.

For example, the arithmetic element 158 may sequentially perform the operation "h[i,:]+=F[k',i]*D[l,:]" of lines "1" and "2" of the algorithm 150; then the arithmetic element 158 may perform the operation "h[i,:]+=F[k,i]*D[l',:]" of lines "3" and "4" of the algorithm 150; then the arithmetic element 158 may perform the operation "h[i,:]−=F[k',i]*D[l',:]" of lines "5" and "6" of the algorithm 150; and then the arithmetic element 158 may perform the operation "h[i,:]−=F[k,i]*D[l,:]" of lines "7" and "8" of the algorithm 150.

Figure 1C:
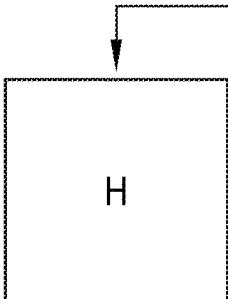
FIG. 1C illustrates other example techniques related to updating a local field matrix.
Figure 1C:
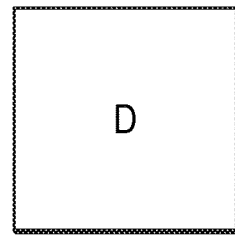
Figure 1C:
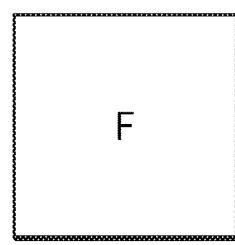
Figure 1C:
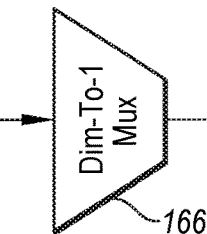
Figure 1C:
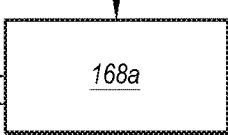
Figure 1C:
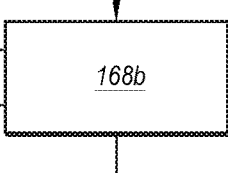

Additionally or alternatively, the LFM engine 108 may be configured to perform, at the same time two or more of the update operations of expression (8) with respect to the four variables at issue. For example, FIG. 1C illustrates another example algorithm 160 that may be used to update the LFM 110 with respect to $x_{k,l}$ and $x_{k',l'}$ having been deactivated and neurons $x_{k',l}$ and $x_{k,l'}$ having been activated as part of the system update 104 of a row/column cross-clustered Boltzmann Machine. The algorithm 160 is configured to update, based on the deactivation of $x_{k,l}$ and $x_{k',l'}$, the elements of the LFM 110 that correspond to $x_{k,l}$ and $x_{k',l'}$ at approximately the same time. The algorithm 160 is also configured to update, based on the activation of $x_{k',l}$ and $x_{k,l'}$, the elements that correspond to $x_{k',l}$ and $x_{k,l'}$ at approximately the same time. As such, the algorithm 160 may be approximately twice as fast as the algorithm 150. The algorithm 160 may be implemented using any suitable implementation of software and/or hardware.

For example, FIG. 1C also illustrates an example hardware implementation 162 of the LFM engine 108 configured to implement the algorithm 160. In the implementation 162, all of the elements may be stored on the same chip. The implementation 162 may be an example implementation of or may include one or more elements of the computing system 202 of FIG. 2 in some embodiments. Additionally or alternatively, the implementation 162 may use a graphics processing unit (GPU) and/or a field programmable gate array (FPGA) to perform one or more of processing functions in some embodiments.

Further, the LFM 110 may be represented by "H" and the first matrix 112 and the second matrix 114 may be represented by "F" and "D", respectively. Additionally, in the illustrated example, "H", "F", and "D" may be stored on on-chip memory 164 of the implementation 162. The "F" matrix may be a "DIM×DIM" matrix, and a Dim-to-1 mux 166 of the implementation 162 may be configured to select the pertinent portions of "F" in performing the operations of the algorithm 160.

Further, the implementation 162 may include an arithmetic element 168a configured to perform the multiply and add operations of lines "1" and "2" of the algorithm 160 with respect to the corresponding elements of "F" and "D". Additionally or alternatively, the implementation 162 may include an arithmetic element 168b configured to perform the pertinent multiply and add operations of lines "3" and "4" of the algorithm 160 with respect to the corresponding elements of "F" and "D". In these or other embodiments, the implementation 162 may include a shift register 165 configured such that the appropriate values of "F" are sent to the arithmetic element 168b at the appropriate time.

Figure 1D:
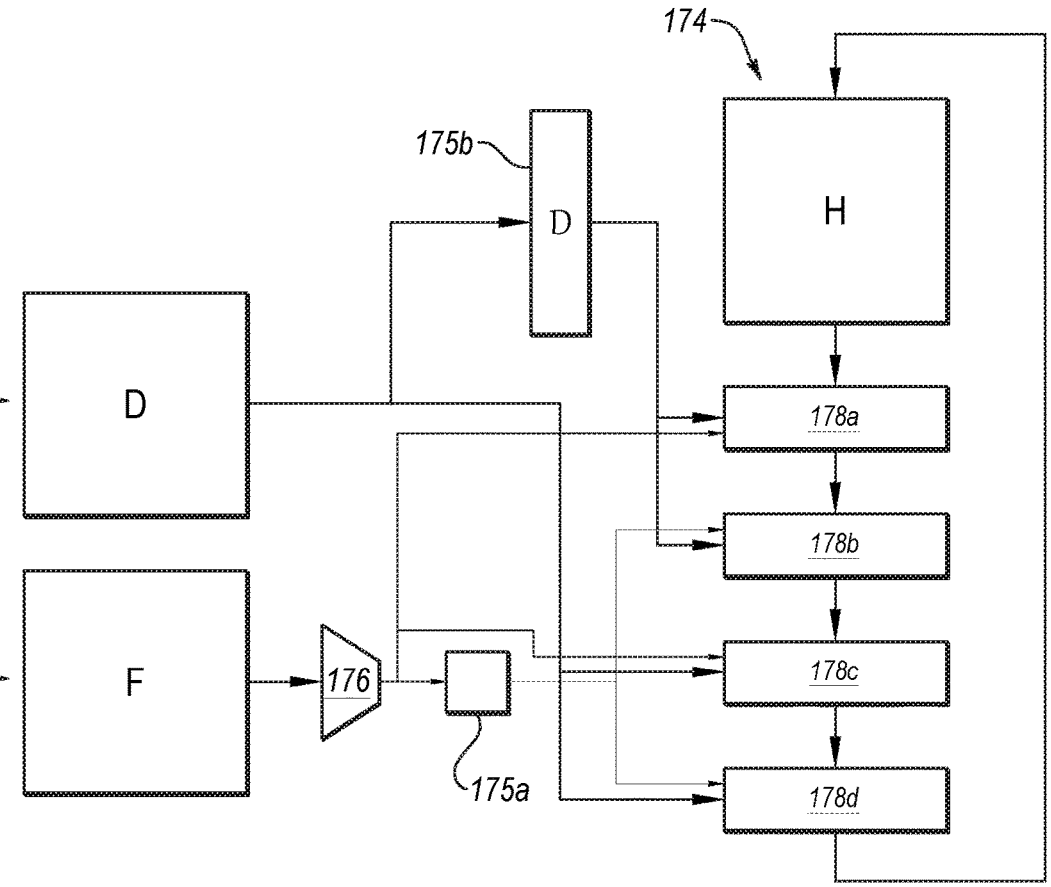
FIG. 1D illustrates other example techniques related to updating a local field matrix.

As another, example, FIG. 1D illustrates another example algorithm 170 that may be used to update the LFM 110 with respect to $x_{k,l}$ and $x_{k',l'}$ having been deactivated and neurons $x_{k',l}$ and $x_{k,l'}$ having been activated as part of the system update 104 of a row/column cross-clustered Boltzmann Machine. The algorithm 170 is configured to update the elements of the LFM 110 that correspond to $x_{k,l}$, $x_{k',l}$, $x_{k',l'}$, and $x_{k,l'}$ at substantially the same time. As such, the algorithm 170 may be approximately twice as fast as the algorithm 160 and may be approximately four times faster than the algorithm 150. The algorithm 170 may be implemented using any suitable implementation of software and/or hardware.

For example, FIG. 1D also illustrates an example hardware implementation 172 of the LFM engine 108 configured to implement the algorithm 170. In the implementation 172, all of the elements may be stored on the same chip. The implementation 172 may be an example implementation of or may include one or more elements of the computing system 202 of FIG. 2 in some embodiments. Additionally or alternatively, the implementation 172 may use a graphics processing unit (GPU) and/or a field programmable gate array (FPGA) to perform one or more of processing functions in some embodiments.

Further, the LFM 110 may be represented by "H" and the first matrix 112 and the second matrix 114 may be represented by "F" and "D", respectively. Additionally, in the illustrated example, "H", "F", and "D" may be stored on on-chip memory 174 of the implementation 172. The "F" matrix may be a "DIM×DIM" matrix, and a Dim-to-1 mux 176 of the implementation 172 may be configured to select the pertinent portions of "F" in performing the operations of the algorithm 170.

Further, the implementation 172 may include an arithmetic element 178a, an arithmetic element 178b, an arithmetic element 178c, and an arithmetic element 178d. The arithmetic element 178a may be configured to perform the multiply and add operations "h[i,:]+=F[k',i]*D[l,:]" of line "2" of the algorithm 170 with respect to the corresponding elements of "F" and "D". The arithmetic element 178b may be configured to perform the multiply and add operations "h[i,:]−=F[k,i]*D[l,:]" of line "3" of the algorithm 170 with respect to the corresponding elements of "F" and "D". The arithmetic element 178c may be configured to perform the multiply and add operations "h[i,:]+=F[k,i]*D[l',:]" of line "2" of the algorithm 170 with respect to the corresponding elements of "F" and "D". The arithmetic element 178d may be configured to perform the multiply and add operations "h[i,:]−=F[k',i]*D[l',:]" of line "3" of the algorithm 170 with respect to the corresponding elements of "F" and "D".

In these or other embodiments, the implementation 172 may include a shift register 175a configured such that the appropriate values of "F" are sent to the arithmetic elements 178b and 178d at the appropriate time. In these or other embodiments, the implementation 172 may include a shift register 175b configured such that the appropriate values of "D" are sent to the arithmetic elements 178a and 178b at the appropriate time.

As another example, in some embodiments, expression (8) may be simplified such that the LFM engine 108 may update the four elements of the LFM 110 at issue at the same time according to the following expression (9):

$$h[i,:]+=(F[k',i]-F[k,i])*(D[l,:]-D[l',:]) \quad (9)$$

Figure 1E:
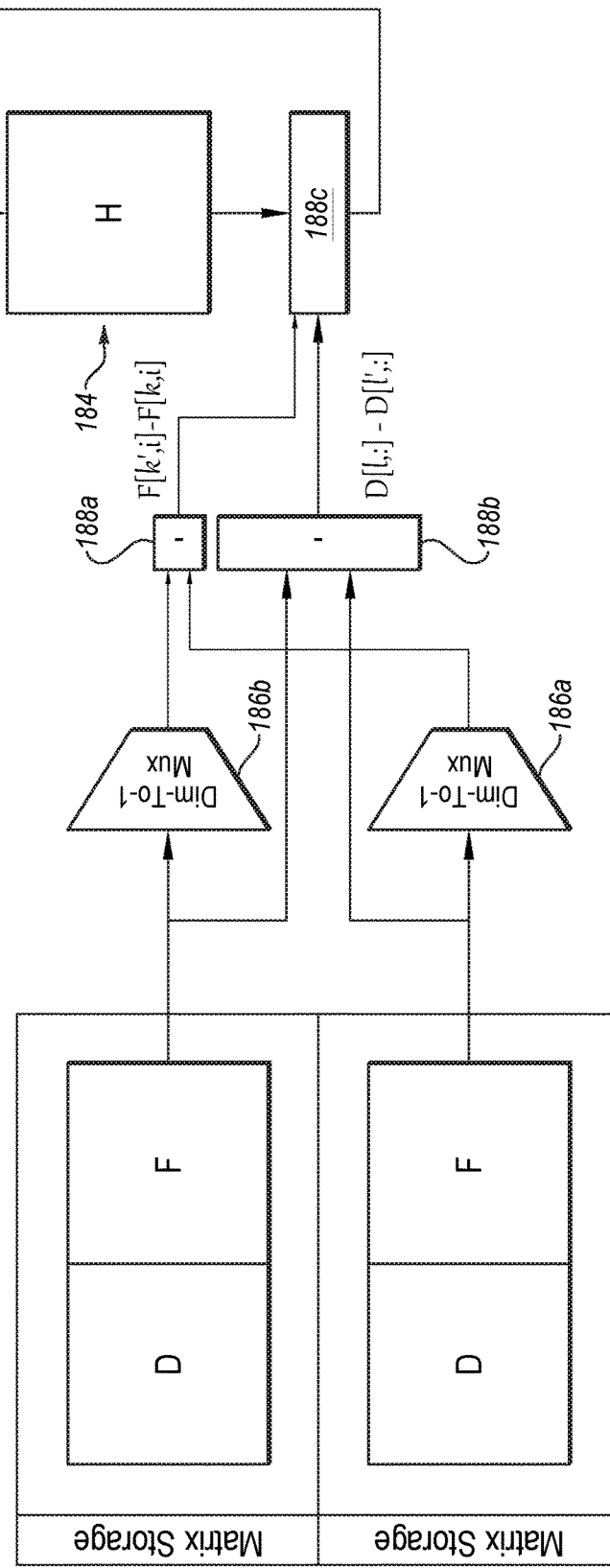
FIG. 1E illustrates other example techniques related to updating a local field matrix.

FIG. 1E illustrates another example algorithm 180 that may be used to update, based on the expression (9), the LFM 110 with respect to $x_{k,l}$ and $x_{k',l'}$ having been deactivated and neurons $x_{k',l}$ and $x_{k,l'}$ having been activated as part of the system update 104 of a row/column cross-clustered Boltzmann Machine. The algorithm 180 is configured to update the elements of the LFM 110 that correspond to $X_{k,l}$, $X_{k',l'}$, $x_{k',l}$, and $x_{k,l'}$ at substantially the same time. As such, the algorithm 180 may be approximately twice as fast as the algorithm 160 and may be approximately four times faster than the algorithm 150. The algorithm 180 may be implemented using any suitable implementation of software and/or hardware.

For example, FIG. 1E also illustrates an example hardware implementation 182 of the LFM engine 108 configured to implement the algorithm 180. In the implementation 182, all of the elements may be stored on the same chip. The implementation 182 may be an example implementation of or may include one or more elements of the computing system 202 of FIG. 2 in some embodiments. Additionally or alternatively, the implementation 182 may use a graphics processing unit (GPU) and/or a field programmable gate array (FPGA) to perform one or more of processing functions in some embodiments.

Further, the LFM 110 may be represented by "H" and the first matrix 112 and the second matrix 114 may be represented by "F" and "D", respectively. Additionally, in the illustrated example, "H", "F", and "D" may be stored on on-chip memory 184 of the implementation 182. Further, in the implementation 182, "F" and "D" may be stored twice to help increase the speed of performing the algorithm 180. The "F" and the "D" matrices may each be a "DIM×DIM" matrix. Dim-to-1 muxes 186a and 186b of the implementation 182 may be configured to select the pertinent portions of "F" and "D" in performing the operations of the algorithm 180.

Further, the implementation 182 may include an arithmetic element 188a, an arithmetic element 188b, and an arithmetic element 188c. The arithmetic element 188a may be configured to perform the add operations "F[k',i]−F[k,i]" of line "3" of the algorithm 180 with respect to the corresponding elements of "F" to obtain "$F_{diff}$". The arithmetic element 188b may be configured to perform the add operations "D[l,:]−D [l',:]" of line "1" of the algorithm 180 with respect to the corresponding elements of "D" to obtain "$D_{diff}$[:]". The arithmetic element 188c may be configured to perform the multiply and add operations "h[i,:]+=$F_{diff}$*$D_{diff}$[:]" of line "4" of the algorithm 180 with respect to the results provided by the arithmetic elements 188a and 188b.

Figure 1F:
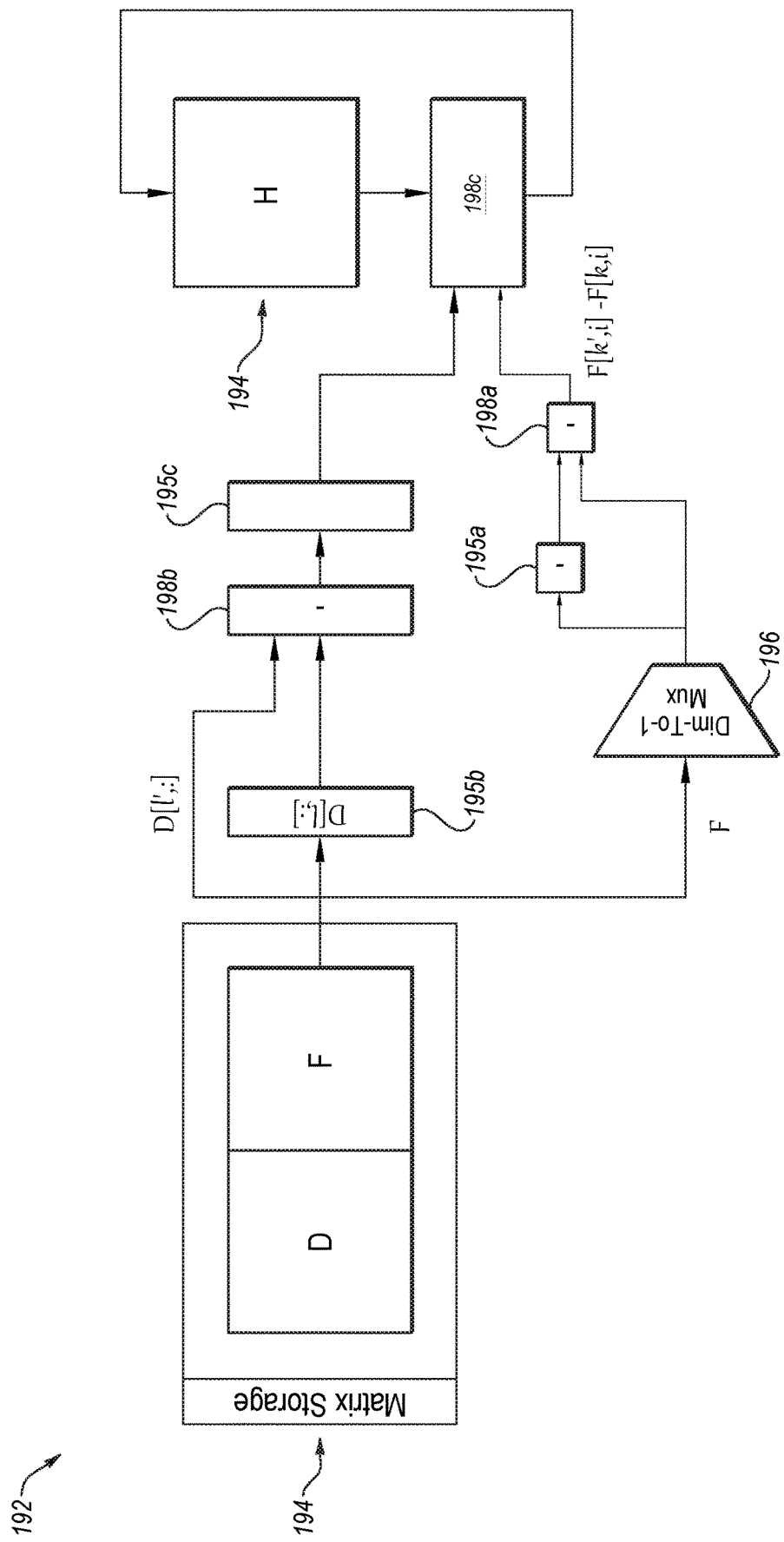
FIG. 1F illustrates other example techniques related to updating a local field matrix.

FIG. 1F also illustrates an example hardware implementation 192 of the LFM engine 108 configured to implement the algorithm 180. In the implementation 192, all of the elements may be stored on the same chip. The implementation 192 may be an example implementation of or may include one or more elements of the computing system 202 of FIG. 2 in some embodiments. Additionally or alternatively, the implementation 192 may use a graphics processing unit (GPU) and/or a field programmable gate array (FPGA) to perform one or more of processing functions in some embodiments.

Further, the LFM 110 may be represented by "H" and the first matrix 112 and the second matrix 114 may be represented by "F" and "D", respectively. Additionally, in the illustrated example, "H", "F", and "D" may be stored on on-chip memory 194 of the implementation 192. The "F" matrix may be a "DIM×DIM" matrix. Dim-to-1 mux 196 of the implementation 182 may be configured to select the pertinent portions of "F" in performing the operations of the algorithm 180.

Further, the implementation 182 may include an arithmetic element 198a, an arithmetic element 198b, and an arithmetic element 198c. The arithmetic element 198a may be configured to perform the add operations "F[k',i]−F[k,i]" of line "3" of the algorithm 180 with respect to the corresponding elements of "F". The arithmetic element 198b may be configured to perform the add operations "D[l,:]−D[l',:]" of line "1" of the algorithm 180 with respect to the corresponding elements of "D". The arithmetic element 198c may be configured to perform the multiply and add operations "h[i,:]+=$F_{diff}$*$D_{diff}$[:]" of line "4" of the algorithm 180 with respect to the results provided by the arithmetic elements 198a and 198b.

In these or other embodiments, the implementation 192 may include a shift register 195a configured such that the appropriate values of "F" are sent to the arithmetic elements 198a at the appropriate time. In these or other embodiments, the implementation 192 may include a shift register 195b configured such that the appropriate values of "D" are sent to the arithmetic element 198b at the appropriate time.

Returning to FIG. 1A, in some embodiments, the first matrix 112 and/or the second matrix 114 may be asymmetric. In these or other embodiments, one or more preprocessing operations may be performed on the asymmetric matrix to make it symmetric. Additionally or alternatively, in some of such instances (e.g., instances in which preprocessing is not performed or is unable to make the asymmetric matrix symmetric), the determination of the weights for updating the LFM 110 may be based on a transposed first matrix 112 and/or a transposed second matric 114.

For example, the first matrix 112 and the second matrix 114 may be asymmetric flow and distance matrices "F" and "D", respectively. In such instances, the sub-weight matrix "$w_{r,c}$" may be determined by determining the tensor product of rows "$F_{r,*}$" and "$D_{c,*}$" of the matrices "F" and "D" as described above while also taking the tensor product of "$(F^T)_{r,*}$" and "$(D^T)_{c,*}$" of the transposed matrices "$F^T$" and "$D^T$", respectively of matrices "F" and "D", respectively, as follows according to expression (10a) or (10b):

$$w_{r,c} = -(F_{r,*})^T \otimes (D_{c,*})^T - F_{*,r} \otimes D_{*,c} \quad (10)$$

$$w_{r,c} = -(F_{r,*})^T \otimes (D_{c,*})^T - ((F^T)_{r,*})^T \otimes ((D^T)_{c,*})^T \quad (10b)$$

Based on expressions (2) and (10a), the portion of the LFM 110 that corresponds to the system update 104 ("$h_{i,*}$") may be changed according to the following expression (11a) in such asymmetric situations:

$$h[i,:] \mathrel{+}= F[k',i]*D[l,:] + F[k,i]*D[l',:] - F[k,i]*D[l,:] - F[k',i]*D[l',:] + F[i,k]*(D[:,l])^T + F[i,k]*(D[:,l'])^T - F[i,k]*(D[:,l])^T - F[i,k']*(D[:,l'])^T \quad (11a)$$

Additionally or alternatively, based on expressions (2) and (10b) the portion of the LFM 110 that corresponds to the system update 104 ("h") may be changed according to the following expression (11b) in such asymmetric situations, which may improve cache locality:

$$h[i,:] \mathrel{+}= F[k',i]*D[l,:] + F[k,i]*D[l',:] - F[k,i]*D[l,:] - F[k',i]*D[l',:] + F^T[k',i]*D^T[l,:] + F^T[k,i]*D^T[l',:] - F^T[k,i]*D^T[l,:] - F^T[k',i]*D^T[l',:] \quad (11b)$$

In some embodiments, one or more variations may be made to the algorithms and/or hardware implementations described above with respect to FIGS. 1B-1F described above to account for the added operations that may be performed with respect to asymmetric matrices. For example, the transposed "F" and "D" matrices may also be stored in on-chip memory. Further, one or more arithmetic elements, muxes, and/or registers may be used to account for the additional operations that may be performed. Additionally or alternatively, one or more operations of the expression (11) may be performed sequentially. In these or other embodiments, two or more of the operations of the expression (11) may be performed together. Additionally or alternatively, the operations of the expression (11) may all be performed at substantially the same time.

For example, in some embodiments, expression (11a) may be simplified such that the LFM engine 108 may update the four elements of the LFM 110 at issue at the same time according to the following expression (12a):

$$h[i,:] \mathrel{+}= (F[k',i] - F[k,i])*(D[l,:] - D[l',:]) + (F[i,k'] - F[i,k])*(D[:,l] - D[:,l'])^T \quad (12a)$$

Additionally or alternatively, expression (11b) may be simplified according to the following expression (12b):

$$h[i,:] \mathrel{+}= (F[k',i] - F[k,i])*(D[l,:] - D[l',:]) + (F^T[k',i] - F^T[k,i])*(D^T[l,:] - D^T[l',:]) \quad (12b)$$

The updated LFM 110 may be used by the energy engine 102 to generate a new system update 104 as described above in some embodiments. For example, the energy engine 102 may update the energy value of the system 106 using the updated values of the LFM 110 based on expression (3) or expression (4) above. In these or other embodiments, the energy engine 102 may be configured to determine the value of $(w_{k,l:k',l'} + w_{k,l':k',l})$ in expression (4) based on the first matrix 112 and the second matrix 114.

For example, in instances in which the first matrix 112 and the second matrix 114 are symmetric "F" and "D" matrices, the energy engine 102 may determine the value of $(w_{k,l:k',l'} + w_{k,l':k',l})$ in expression (4) as follows according to expression (13):

$$(w_{k,l:k',l'} + w_{k,l':k',l}) = -2 f_{k,k'} d_{l,l'} \quad (13)$$

As another example, in instances in which the first matrix 112 and the second matrix 114 are asymmetric "F" and "D" matrices, the energy engine 102 may determine the value of $(w_{k,l:k',l'} + w_{k,l':k',l})$ in expression (4) as follows according to expression (14):

$$(w_{k,l:k',l'} + w_{k,l':k',l}) = -(f_{k,k'} f_{k',k})(d_{l,l'} + d_{l',l}) \quad (14)$$

The energy engine 102 may then use the updated energy value to determine whether or not to accept a proposed change to the system 106, using the expression (5) or the expression (6) above. The LFM engine 108 may then again update the LFM 110 based on the new system update 104 such as described above as well. In some embodiments, such operations may be performed iteratively until a solution to the optimization problem associated with the system 106 has been obtained. For example, the operations may be performed until the state of the system 106 is associated with a maximum or a minimum Ising energy.

Modifications, additions, or omissions may be made to FIGS. 1A-1F, without departing from the scope of the present disclosure. For example, the algorithms and implementations described with respect to FIGS. 1B-1F are merely examples and are not limiting. In addition, although illustrated and described as being separate from each other, the energy engine 102 and the LFM engine 108 may be combined in some embodiments. Additionally or alternatively, the operations described as being performed by the energy engine 102 and/or the LFM engine 108 may be performed by any applicable implementation that may not be exactly the same as that described herein. Additionally, the environment 100 may include more or fewer elements than those illustrated and described in the present disclosure. Further, the specific configuration, association, or inclusion of the elements in particular devices or systems may vary depending on specific implementations.

Figure 2:
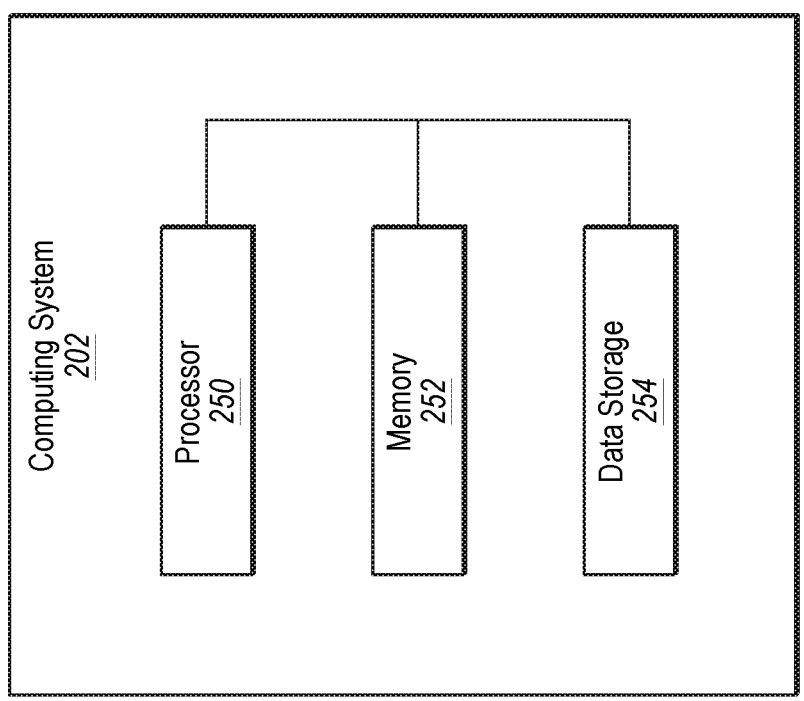
FIG. 2 illustrates a block diagram of an example computing system configured to perform a replica exchange process.

FIG. 2 illustrates a block diagram of an example computing system 202 configured to perform one or more operations described herein, according to at least one embodiment of the present disclosure. For example, the computing system 202 may be configured to implement or direct one or more operations associated with the energy engine 102 and/or the LFM 108 of FIG. 1A in some embodiments. In some embodiments, the computing system 202 may be included in or form part of an annealing system. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), a graphics processing unit (GPU), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions. For example, in some embodiments, the energy engine 102 and/or the LFM engine 108 of FIG. 1A may be software modules that are program instructions that may be loaded into the memory 252 and executed by the processor 250.

The memory 252 and the data storage 254 may include computer-readable storage media for carrying or having computer-executable instructions or data structures stored thereon. Such computer-readable storage media may include any available non-transitory media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuuten, 500 F.3d 1346 (Fed. Cir. 2007).

Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described. Additionally or alternatively, the computing system 202 may include fewer elements or be configured differently. For example, the memory 252 and/or the data storage 254 may be omitted or may be part of the same computer-readable storage media. In addition, reference to hardware or operations performed by hardware in the present disclosure may refer to any applicable operation, configuration, or combination of one or more of the elements of the computing system 202.

Figure 3:
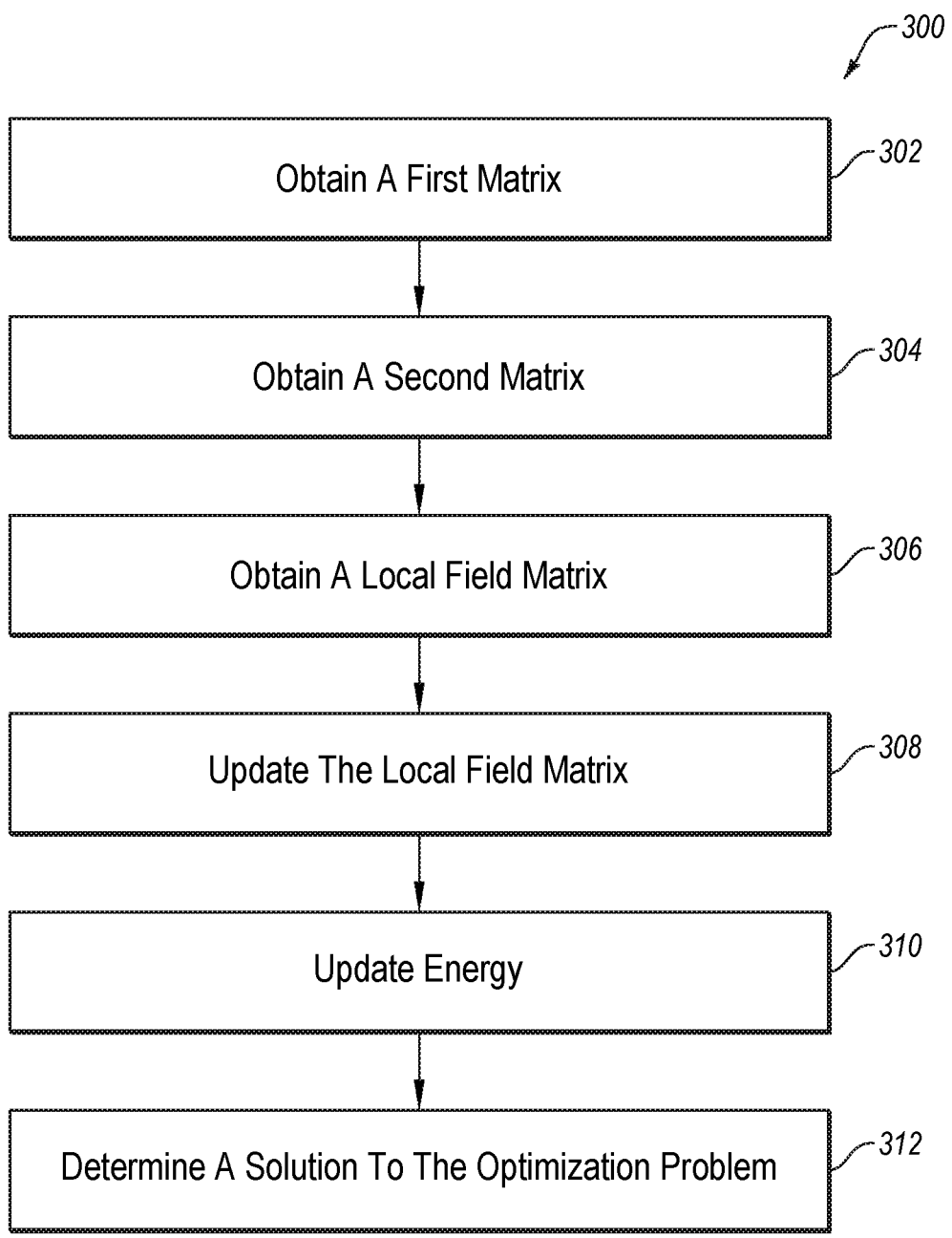
FIG. 3 illustrates a flowchart of an example method of solving an optimization problem.

FIG. 3 illustrates a flowchart of an example method 300 of solving an optimization problem, according to at least one embodiment described in the present disclosure. The operations of the method 300 may be performed by any suitable system, apparatus, or device. For example, the energy engine 102 and/or the LFM engine 108 of FIG. 1A or the computing system 202 of FIG. 2 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

At block 302, a first matrix associated with an optimization problem associated with a system may be obtained. Obtaining the first matrix may include accessing the first matrix as stored in computer-readable media. Additionally or alternatively, obtaining the first matrix may include storing the first matrix in the computer-readable media.

The first matrix 112 of FIG. 1A may be an example of the first matrix. In some embodiments, the optimization problem may be a quadratic assignment problem and the first matrix may be a distance matrix of the quadratic assignment problem. In some embodiments, the first matrix may be symmetric. Additionally or alternatively, the first matrix may be asymmetric. In some instances in which the first matrix is asymmetric, one or more applicable operations may be performed on the first matrix to make it symmetric.

In some embodiments, the first matrix may be stored in a local memory of a chip that includes a processor configured to perform the operations of the method 300. Additionally or alternatively, the first matrix may be stored in a memory or data storage that is not on the same chip as the processor configured to perform the operations of the method 300.

In some embodiments, a transposed first matrix that is a transposition of the first matrix may be obtained. For example, the transposed first matrix may be obtained in instances in which the first matrix is asymmetric. In some instances, the transposed first matrix may have already been created and may be obtained by being accessed or stored. Additionally or alternatively, the transposed first matrix may be generated by performing applicable transposition operations with respect to the first matrix.

In some embodiments, the transposed second matrix may be stored in the local memory of a chip that includes the processor configured to perform the operations of the method 300. Additionally or alternatively, the transposed second matrix may be stored in a memory or data storage that is not on the same chip as the processor configured to perform the operations of the method 300.

At block 304, a second matrix associated with the optimization problem may be obtained. Obtaining the second matrix may include accessing the second matrix as stored in computer-readable media. Additionally or alternatively, obtaining the second matrix may include storing the second matrix in the computer-readable media.

The second matrix 114 of FIG. 1A may be an example of the second matrix. In some embodiments, the optimization problem may be a quadratic assignment problem and the second matrix may be a flow matrix of the quadratic assignment problem. In some embodiments, the second matrix may be symmetric. Additionally or alternatively, the second matrix may be asymmetric. In some instances in which the first matrix is asymmetric, one or more applicable operations may be performed on the first matrix to make it symmetric.

In some embodiments, the second matrix may be stored in the local memory of a chip that includes the processor configured to perform the operations of the method 300. Additionally or alternatively, the second matrix may be stored in a memory or data storage that is not on the same chip as the processor configured to perform the operations of the method 300.

In some embodiments, a transposed second matrix that is a transposition of the second matrix may be obtained. For example, the transposed second matrix may be obtained in instances in which the second matrix is asymmetric. In some instances, the transposed second matrix may have already been created and may be obtained by being accessed or stored. Additionally or alternatively, the transposed second matrix may be generated by performing applicable transposition operations with respect to the second matrix.

In some embodiments, the transposed second matrix may be stored in the local memory of a chip that includes the processor configured to perform the operations of the method 300. Additionally or alternatively, the transposed second matrix may be stored in a memory or data storage that is not on the same chip as the processor configured to perform the operations of the method 300.

The first matrix and the second matrix may relate to corresponding weights given to respective variables of the system in which the corresponding weights relate to relationships between the respective variables and one or more other variables of the system. The system may include any applicable system that may be used to solve the optimization problem and/or that may correspond to the optimization problem. The system 106 of FIG. 1A is an example of the system.

At block 306, a local field matrix associated with the optimization problem may be obtained. The local field matrix may be a matrix that indicates interactions between the variables of the system as influenced by their respective weights, in which the interactions relate to changing of states of the variables during solving of the optimization problem. The LFM 110 of FIG. 1A is an example of the local field matrix that may be obtained.

Obtaining the local field matrix may include accessing the local field matrix as stored in computer-readable media. Additionally or alternatively, obtaining the local field matrix may include storing the local field matrix in the computer-readable media. In some embodiments, obtaining the local field matrix may include generating the local field matrix based on a state variable matrix of the system and based on the first matrix and the second matrix. Additionally or alternatively, the local field matrix may be generated based on the first transposed matrix and/or the second transposed matrix. For example, the local field matrix may be generated based on expression (2) and one or more of expressions (7)-(11) described above with respect to FIG. 1A.

At block 308, the local field matrix may be updated. In some embodiments, the local field matrix may be updated in response to a state change of one or more variables of the system during solving of the optimization problem. As described above, the state change may be accepted based on an energy value that may be determined with respect to the system.

The updating of the local field matrix may include performing one or more arithmetic operations with respect to a first portion of the first matrix and a second portion of the second matrix that correspond to a third portion of the local field matrix that corresponds to the one or more variables that are updated. In these or other embodiments, the updating may include performing one or more arithmetic operations with respect to the transposed first matrix and/or the transposed second matrix (e.g., in instances in which the first matrix and/or the second matrix is asymmetric).

For example, the local field matrix may be updated by performing one or more tensor product operations with respect to a difference between the first portion of the first matrix and the second portion of the second matrix as described above with respect to FIGS. 1A-1F in some embodiments. Additionally or alternatively, the arithmetic operations may include one or more tensor product operations with respect to the transposed first matrix and/or the transposed second matrix, as also described above with respect to FIGS. 1A-1F.

As indicated above, the updating may be performed by dynamically determining the weights based on the first matrix and the second matrix (and in some instances based on the transposed first matrix and the transposed second matrix) such that storage of a global weight matrix may be omitted. As also indicated above, omitting storage of the global weight matrix may reduce the amount of memory resources that may be used in the solving of the optimization problem. Further, as also described above, reducing the amount of memory resources may also reduce the amount of time to solve the optimization problem by enabling of on-chip storage of information used in the solving of the optimization problem.

At block 310, the energy value of the system may be updated based on the updated local field matrix. For example, the energy value of the system may be updated using the updated values of the local field matrix based on expression (3) or expression (4) above.

At block 312, a solution to the optimization problem may be determined based on the energy value. For example, the system may be updated and consequently the local field matrix may be updated any number of times in an iterative manner until the state of the system is associated with the energy value having a maximum or a minimum Ising energy. The system state in such a situation may be used as a solution to the optimization problem.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
   obtaining a first matrix associated with an optimization problem associated with a system;
   obtaining a second matrix associated with the optimization problem, wherein the first matrix and the second matrix relate to corresponding weights given to respective variables of the system in which the corresponding weights relate to relationships between the respective variables and one or more other variables;
   obtaining a local field matrix that indicates interactions between the variables of the system as influenced by their respective weights, in which the interactions relate to changing of states of the variables during solving of the optimization problem;
   in response to a state change of one or more variables of the system during solving of the optimization problem, updating the local field matrix in which the updating includes performing one or more arithmetic operations with respect to a first portion of the first matrix and a second portion of the second matrix that correspond to a third portion of the local field matrix that corresponds to the one or more variables;
   updating an energy value of the system based on the updated local field matrix; and
   determining a solution to the optimization problem based on the energy value.

2. The method of claim 1, wherein the optimization problem is a quadratic assignment problem, the first matrix is a distance matrix of the quadratic assignment problem, and the second matrix is a flow matrix of the quadratic assignment problem.

3. The method of claim 1, wherein the first matrix and the second matrix are symmetric and updating the local field matrix includes performing, as the one or more arithmetic operations, a tensor product operation with respect to a difference between the first portion of the first matrix and the second portion of the second matrix.

4. The method of claim 1, wherein the first matrix and the second matrix are asymmetric and updating the local field matrix includes performing, one or more arithmetic operations with respect to a transposed first matrix and a transposed second matrix.

5. The method of claim 1, further comprising storing the first matrix, the second matrix, and the local field matrix while omitting storing a global weight matrix of the weights during solving of the optimization problem.

6. The method of claim 1, wherein the system is a neural network configured as a Boltzmann Machine.

7. The method of claim 1, wherein the state change of the one or more variables is accepted based on the energy value.

8. One or more non-transitory computer-readable storage media configured to store instructions that, in response to being executed, cause a system to perform operations, the operations comprising:
   obtaining a first matrix associated with an optimization problem associated with a system;
   obtaining a second matrix associated with the optimization problem, wherein the first matrix and the second matrix relate to corresponding weights given to respective variables of the system in which the corresponding weights relate to relationships between the respective variables and one or more other variables;
   obtaining a local field matrix that indicates interactions between the variables of the system as influenced by their respective weights, in which the interactions relate to changing of states of the variables during solving of the optimization problem;
   in response to a state change of one or more variables of the system during solving of the optimization problem, updating the local field matrix in which the updating includes performing one or more arithmetic operations with respect to a first portion of the first matrix and a second portion of the second matrix that correspond to a third portion of the local field matrix that corresponds to the one or more variables;
   updating an energy value of the system based on the updated local field matrix; and
   determining a solution to the optimization problem based on the energy value.

9. The one or more non-transitory computer-readable storage media of claim 8, wherein the optimization problem is a quadratic assignment problem, the first matrix is a distance matrix of the quadratic assignment problem, and the second matrix is a flow matrix of the quadratic assignment problem.

10. The one or more non-transitory computer-readable storage media of claim 8, wherein the first matrix and the second matrix are symmetric and updating the local field matrix includes performing, as the one or more arithmetic operations, a tensor product operation with respect to a difference between the first portion of the first matrix and the second portion of the second matrix.

11. The one or more non-transitory computer-readable storage media of claim 8, wherein the first matrix and the second matrix are asymmetric and updating the local field matrix includes performing one or more arithmetic operations with respect to a transposed first matrix and a transposed second matrix.

12. The one or more non-transitory computer-readable storage media of claim 8, wherein the operations further comprise storing the first matrix, the second matrix, and the local field matrix while omitting storing a global weight matrix of the weights during solving of the optimization problem.

13. The one or more non-transitory computer-readable storage media of claim 8, wherein the system is a neural network configured as a Boltzmann Machine.

14. The one or more non-transitory computer-readable storage media of claim 8, wherein the state change of the one or more variables is accepted based on the energy value.

15. A system comprising:
hardware configured to perform operations, the operations comprising:
obtaining a first matrix associated with an optimization problem associated with a system;
obtaining a second matrix associated with the optimization problem, wherein the first matrix and the second matrix relate to corresponding weights given to respective variables of the system in which the corresponding weights relate to relationships between the respective variables and one or more other variables;
obtaining a local field matrix that indicates interactions between the variables of the system as influenced by their respective weights, in which the interactions relate to changing of states of the variables during solving of the optimization problem;
in response to a state change of one or more variables of the system during solving of the optimization problem, updating the local field matrix in which the updating includes performing one or more arithmetic operations with respect to a first portion of the first matrix and a second portion of the second matrix that correspond to a third portion of the local field matrix that corresponds to the one or more variables;
updating an energy value of the system based on the updated local field matrix; and
determining a solution to the optimization problem based on the energy value.

16. The system of claim 15, wherein the optimization problem is a quadratic assignment problem, the first matrix is a distance matrix of the quadratic assignment problem, and the second matrix is a flow matrix of the quadratic assignment problem.

17. The system of claim 15, wherein the first matrix and the second matrix are symmetric and updating the local field matrix includes performing, as the one or more arithmetic operations, a tensor product operation with respect to a difference between the first portion of the first matrix and the second portion of the second matrix.

18. The system of claim 15, wherein the first matrix and the second matrix are asymmetric and updating the local field matrix includes performing one or more arithmetic operations with respect to a transposed first matrix and a transposed second matrix.

19. The system of claim 15, wherein the operations further comprise storing the first matrix, the second matrix, and the local field matrix while omitting storing a global weight matrix of the weights during solving of the optimization problem.

20. The system of claim 15, wherein the state change of the one or more variables is accepted based on the energy value.

* * * * *